W. G. TEMPLETON.
VENDING MACHINE.
APPLICATION FILED MAR. 29, 1916.
1,331,830.
Patented Feb. 24, 1920.
7 SHEETS—SHEET 2.
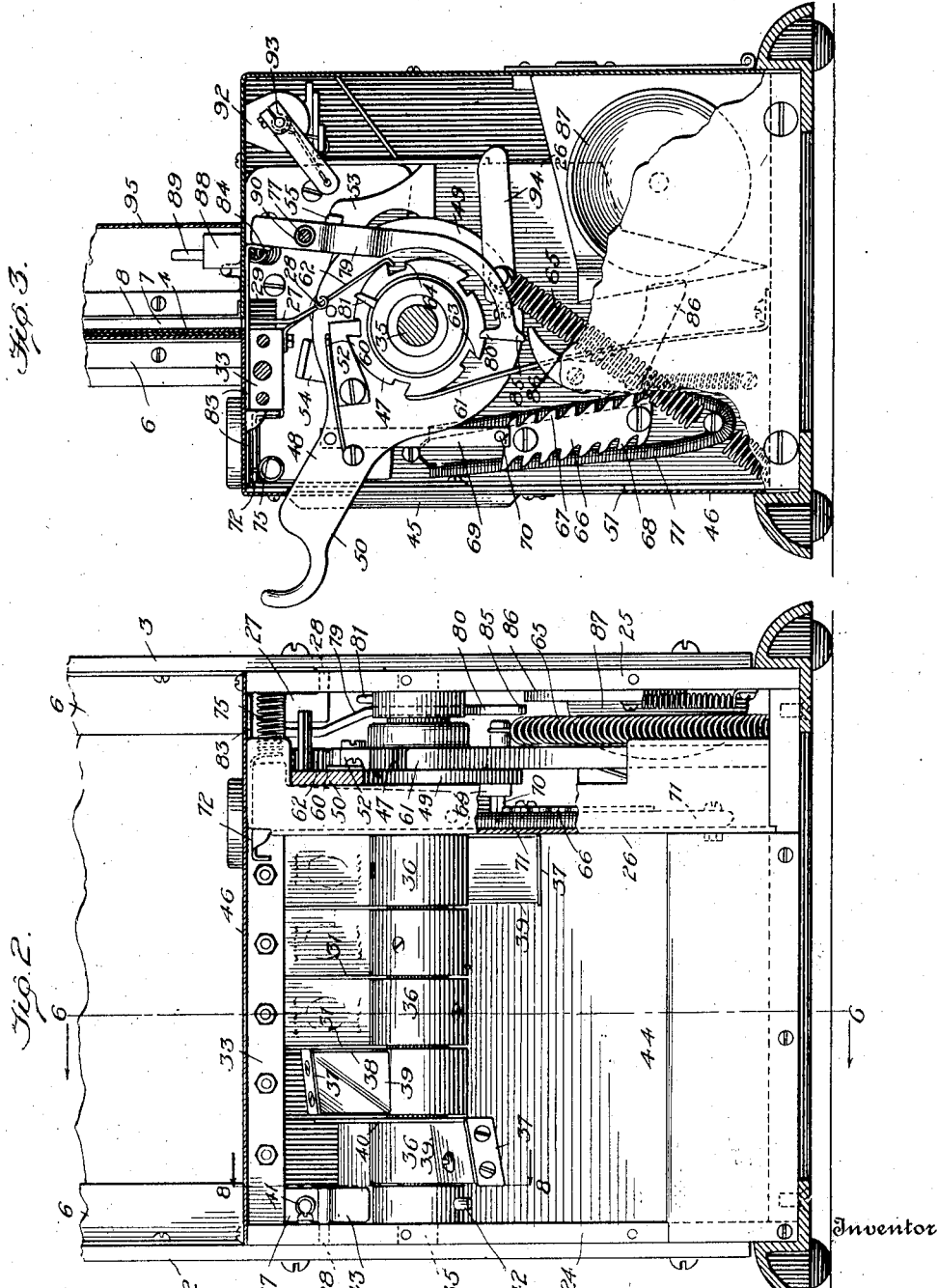

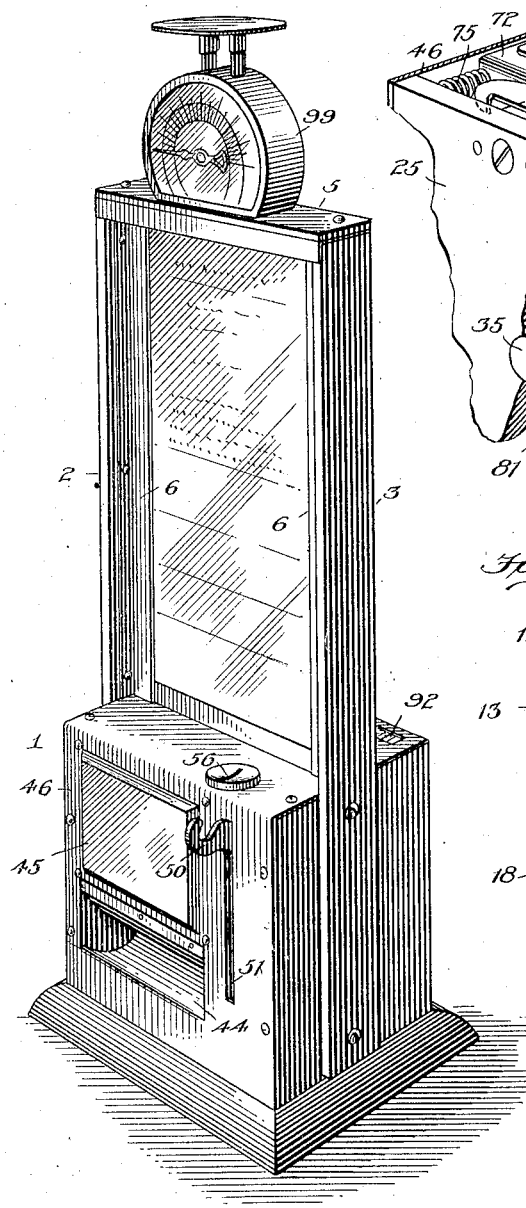

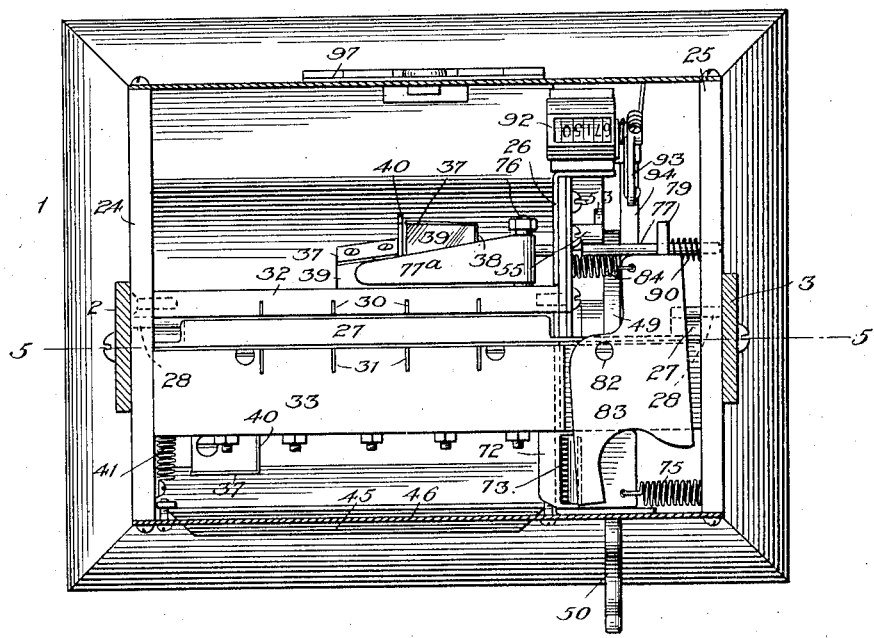
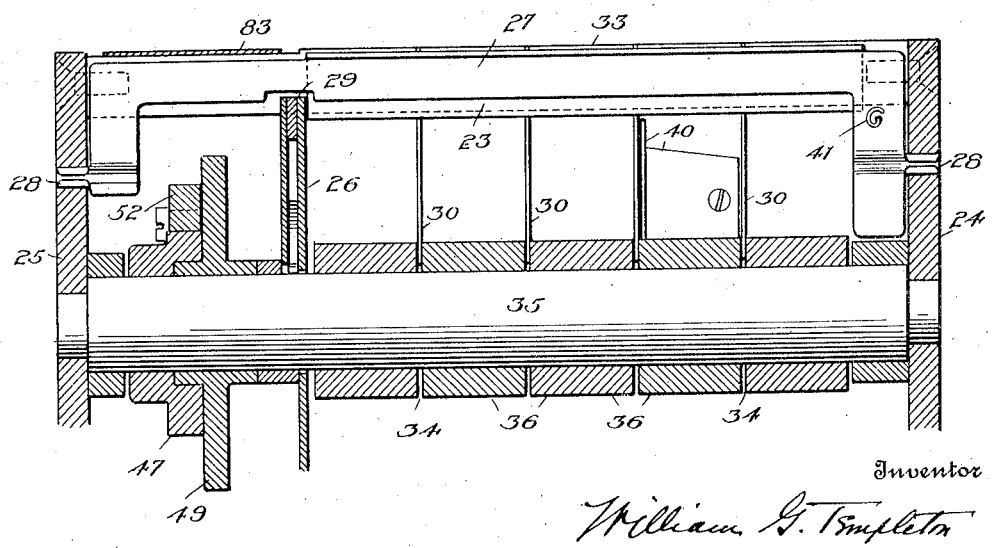

W. G. TEMPLETON.
VENDING MACHINE.
APPLICATION FILED MAR. 29, 1916.

1,331,830.

Patented Feb. 24, 1920.
7 SHEETS—SHEET 4.

Inventor
William G. Templeton
By Church & Church
his Attorneys

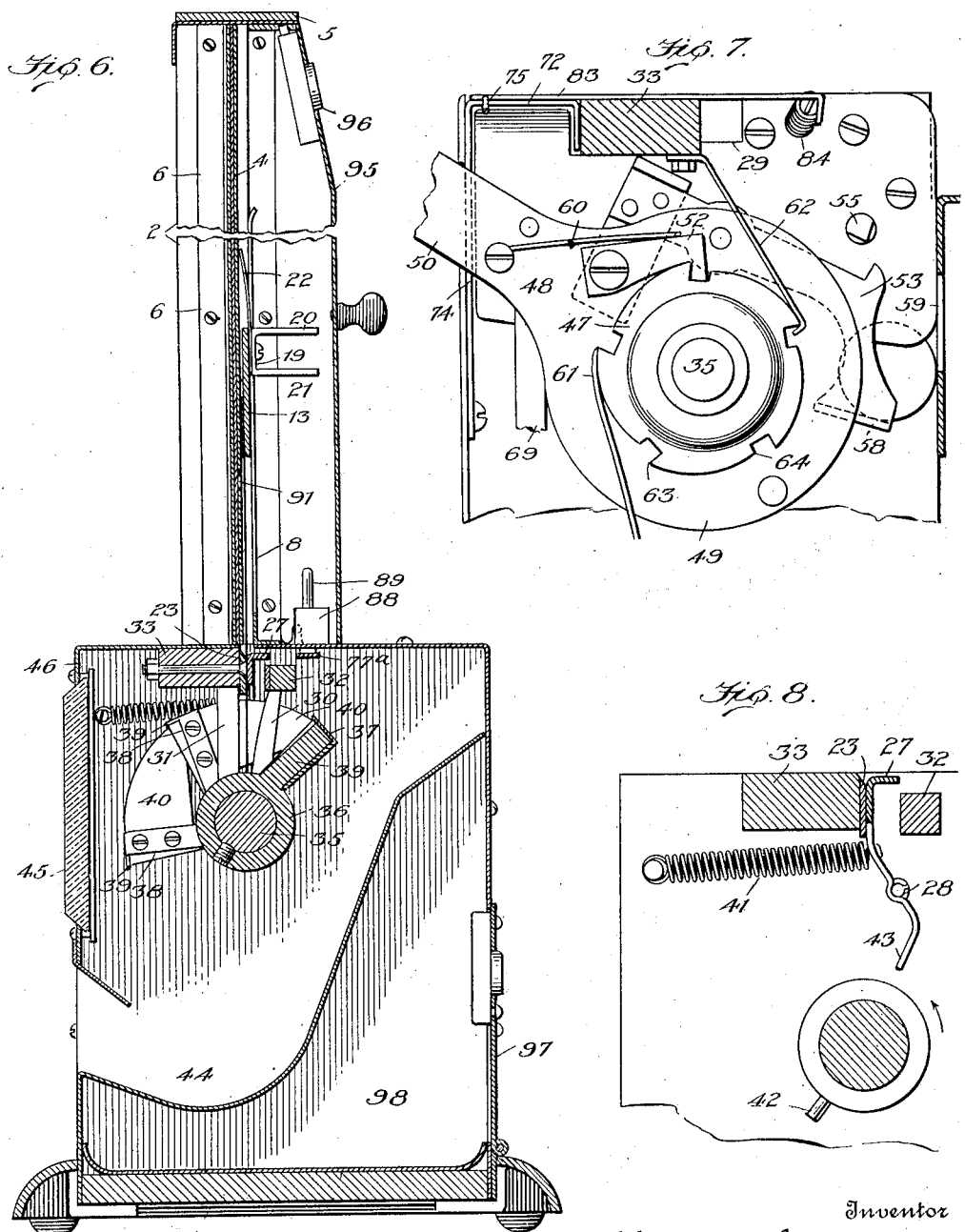

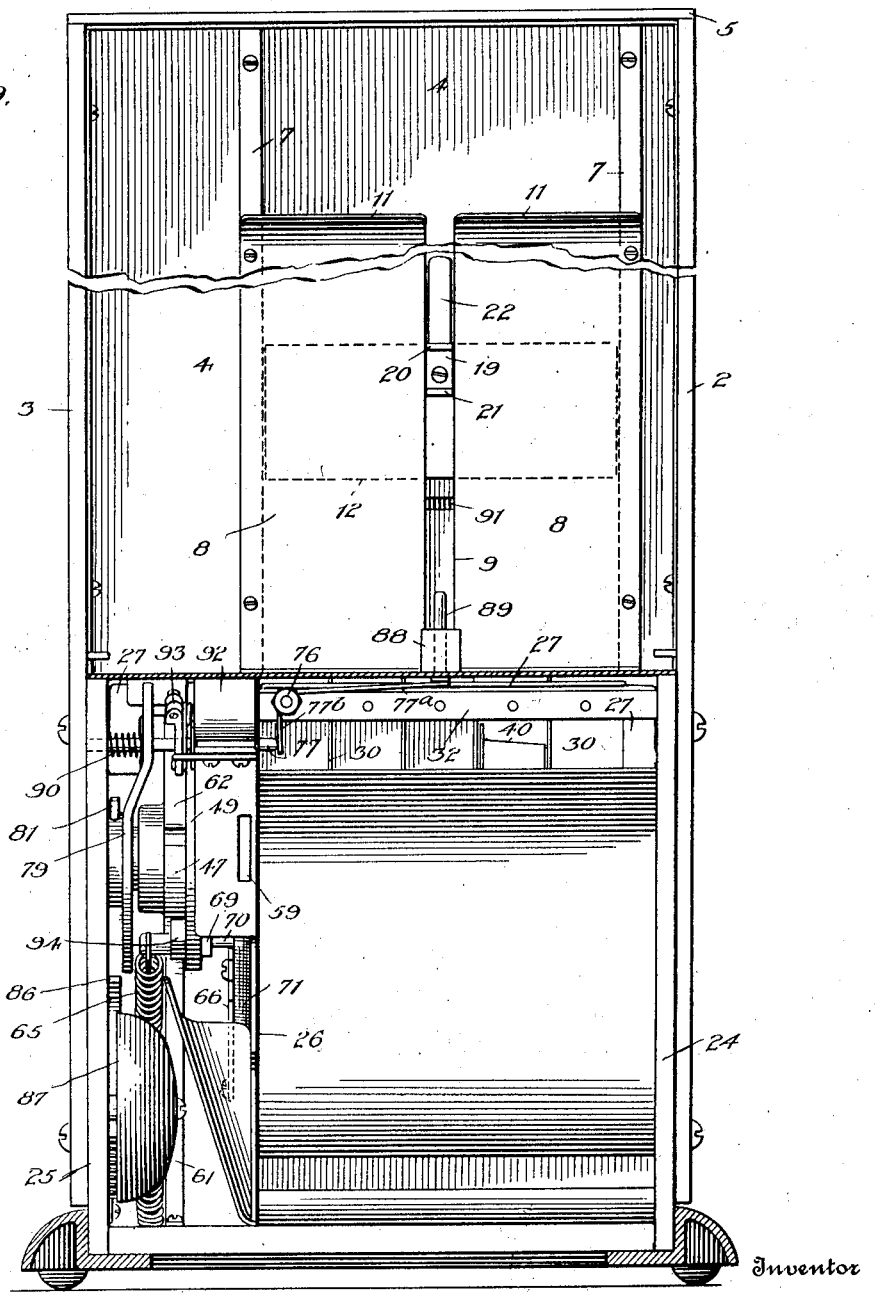

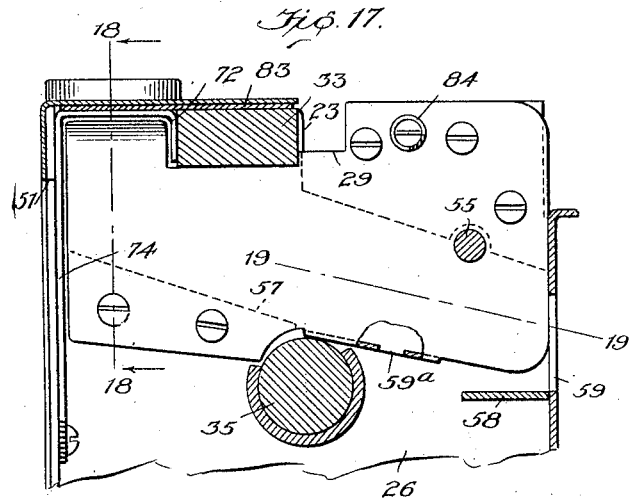
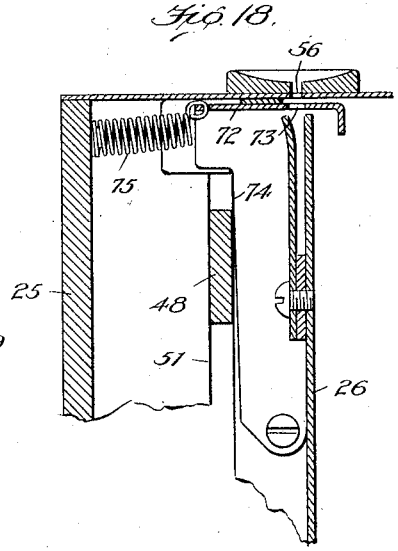
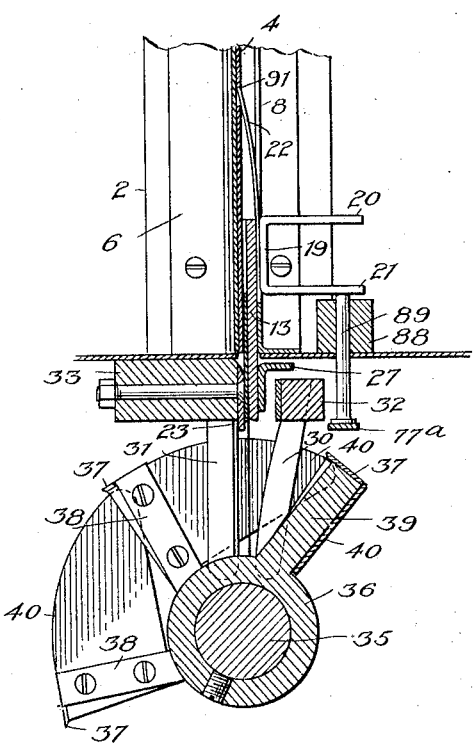
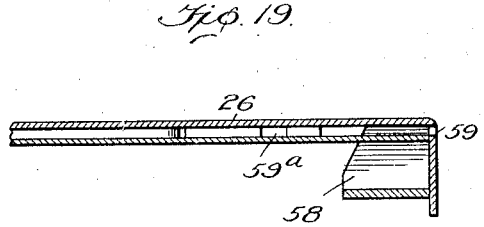
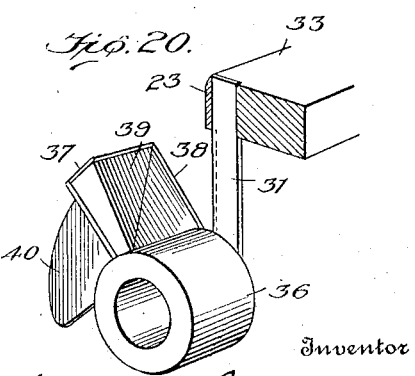

UNITED STATES PATENT OFFICE.

WILLIAM G. TEMPLETON, OF COLORADO SPRINGS, COLORADO, ASSIGNOR OF ONE-FOURTH TO HARRY H. SELDOMRIDGE, ONE-FOURTH TO CHARLES B. SELDOMRIDGE, AND ONE-FOURTH TO WILLIAM N. BURGESS, ALL OF COLORADO SPRINGS, COLORADO.

VENDING-MACHINE.

1,331,830.     Specification of Letters Patent.     Patented Feb. 24, 1920.

Application filed March 29, 1916. Serial No. 87,552.

*To all whom it may concern:*

Be it known that I, WILLIAM G. TEMPLETON, a citizen of the United States, residing at Colorado Springs, in the county of El Paso and State of Colorado, have invented certain new and useful Improvements in Vending-Machines; and I do hereby declare the same to be a full, clear, and exact description of the same, reference being had to the accompanying drawings, forming part of this specification.

This invention relates generally to vending machines, and in the particular embodiment herein illustrated to vending machines, which upon the manipulation of suitable release mechanism, deliver stamps, coupons, tickets and other similar commodities.

The particular apparatus adopted for illustrating the invention is, on general lines, similar to that disclosed in my prior Patent No. 1,157,649, dated October 19, 1915, wherein the machine is designed primarily for the vending or delivery of stamps and is adapted to handle the ordinary sheets of stamps such as are printed with ten columns and rows in a sheet. It will be readily understood, however, that certain improvements made by the present invention and hereinafter claimed, are not necessarily limited in their application to the type of machine above referred to, but may also be embodied in other types of machines as well, and without departing in any way from the spirit and scope of the invention.

In this particular embodiment, the machine may deliver either a single stamp at each operation, or any desired number within the capacity of the reservoir which is adapted to hold the sheets with the stamps arranged to register with each other. For the purposes of the present application it will be sufficient, however, to describe the machine as designed for the handling of a single sheet of stamps which is folded once at the center or along the central line between the stamps following the usual line of perforations and a second sheet the size of one of the folded sections and in registry with the folded sections, whereby the three thicknesses of stamps are caused to occupy a parallel relationship with the stamps of each part in accurate registry. This arrangement of the thicknesses overcomes any difficulty due to a lack of registry, such as might otherwise be occasioned by margins of unequal width.

A machine of this type embodies generally a part which may be termed a vertical reservoir in which there is mounted or located between suitable side plates parallel sheets of stamps or articles to be delivered, said sheets being adapted to be fed downwardly by a suitable weighted feeder located above the same and to be clamped or grasped immediately above the lowermost row, which latter row is adapted to have its units removed successively by cutters or severing devices arranged in stepped order around a suitable operating shaft or drum. The operating shaft is adapted to be rotated so as to carry one cutter or severing device past the severing point at each operation of the machine, provision being made whereby the operating shaft is normally locked against movement but is adapted to be released by a coin or token, and, when released, it may be operated manually in such manner that the shaft or drum will be rotated forwardly, but cannot be rotated rearwardly. By an improved arrangement, an incomplete forward movement of the operating shaft or drum will result in the parts being locked in such position that the movement must be completed before the machine will be again locked and before another coin or token can be brought into position to operate the releasing mechanism. Provision is also made to prevent the deposit of a coin in the machine during the operating movement of the shaft or drum, or when said shaft or drum is locked in the manner above set forth. Thus, it not only becomes practically impossible to so manipulate the machine as to cause the delivery of a second article before the complete delivery of the article which should have been delivered by the first operation of the machine, but it is also impossible to deposit a coin in the machine until an operating cycle permitted by a previously deposited coin has been completed.

According to the present invention, provision is further made to prevent the deposit of a coin and thus manipulation of the operating parts of the machine, after the supply of stamps or other articles for delivery has been exhausted. Mechanism for bringing about this condition becomes effective immediately upon the delivery of the last stamp in the reservoir, to positively prevent the deposit of a coin and lock the machine, until the supply has been replenished. Preferably, the locking of the machine at this time is attended by the actuation of a suitable alarm or the giving of an indication, so as to promptly notify the proprietor of the machine that the stock is exhausted.

Other objects of the invention consist in generally improving the structure and organization of the parts so as to produce a machine not only exceedingly efficient in operation but also exceedingly simple in construction. A full understanding of the nature and objects of the invention will be attained from the ensuing detailed description, when taken in connection with the accompanying drawings, which illustrate one type of machine to which the present improvements may be applied. The novel features of the invention will be particularly pointed out and specified in the claims at the end of the specification.

In the drawings:

Figure 1 is a perspective view of a stamp vending machine embodying the present improvements.

Fig. 2 is a front sectional elevation of the lower portion of the machine.

Fig. 3 is a side sectional elevation looking toward the left hand side of Fig. 2.

Fig. 4 is a top plan view of the lower portion of the machine with the top of the lower casing removed.

Fig. 6 is a vertical transverse section taken substantially in a plane indicated by the line 6—6 of Fig. 2.

Fig. 7 is a detail view of certain of the parts for operating the shaft or drum carrying the knives or cutters, the lever and the parts being shown in the position which they assume when the lever is manipulated to deliver a stamp or stamps from the machine.

Fig. 8 is a transverse vertical section taken substantially in a plane indicated by the line 8—8 of Fig. 2.

Fig. 9 is a rear sectional elevation of the machine.

Fig. 10 is a longitudinal vertical section looking toward the front of the machine, the view being taken substantially in the same plane as that of Fig. 5.

Fig. 11 is a detail perspective view of a portion of the mechanism for preventing the deposit of a coin in the machine after the stock of articles in the reservoir is exhausted, the parts being shown in operated position.

Fig. 13 is a detail view of the weighted feeding member or stamp holder for feeding the stamps.

Fig. 14 is a section of said feeding member on the line 14—14 of Fig. 13.

Fig. 15 is a detail view of the deflector carried by a knife or cutter for insuring the deposit of the several stamps in the exit opening.

Fig. 16 is a detail view of the means for locking the feeding member or stamp holder in position when the supply of stamps is exhausted.

Fig. 17 is a detail side sectional elevation of the coin deposit chute.

Fig. 18 is a vertical section on the line 18—18 of Fig. 17.

Fig. 19 is a section on the line 19—19 of Fig. 17.

Fig. 20 is an enlarged perspective of one of the collars carrying the rotary knives.

Like characters of reference in the several figures indicate the same parts.

Figure 5:
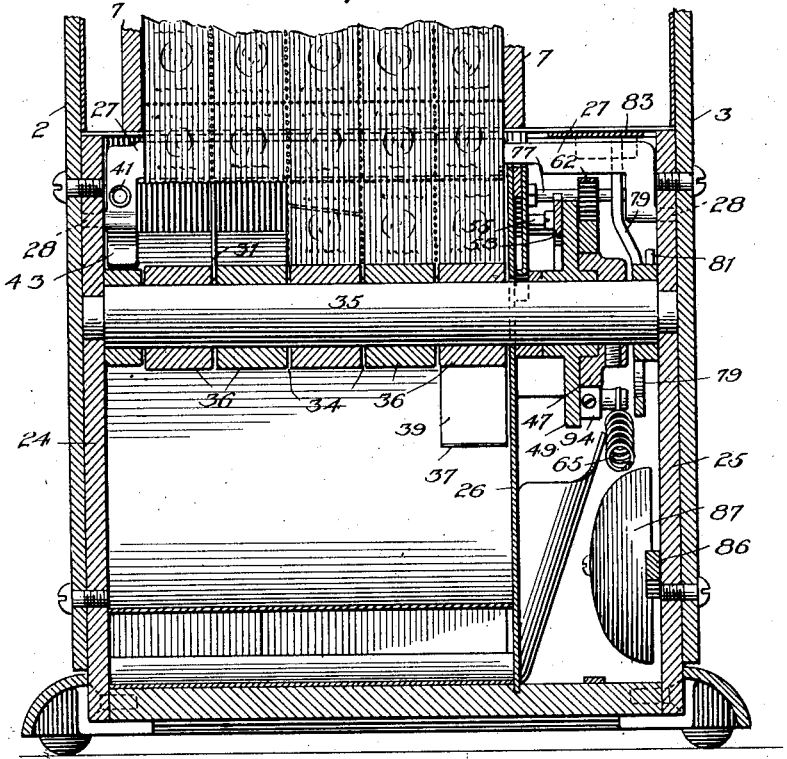
Fig. 5 is a central vertical longitudinal section of the machine looking toward the rear of the machine, the view being taken substantially in a plane indicated by the line 5—5 of Fig. 4.
Figure 12:
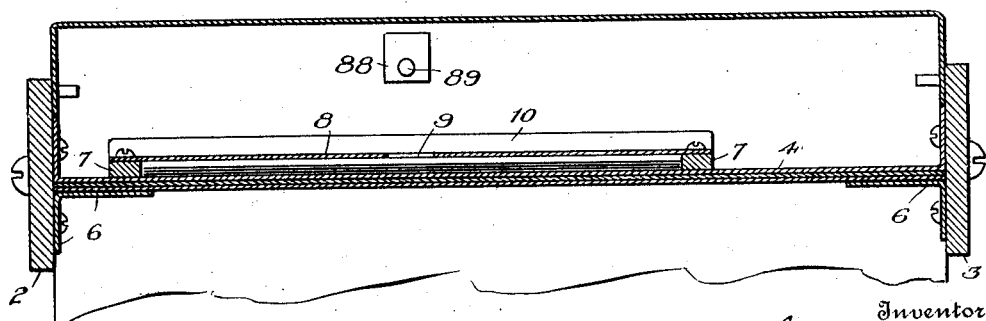
Fig. 12 is a horizontal section through the top or reservoir of the machine.

Referring now more particularly to Figs. 1 and 2, of the drawings, it will be seen that from a base or lower casing 1 a reservoir projects upwardly. This reservoir is conveniently constructed of a surrounding frame consisting of the vertical end pieces 2 and 3 supporting between them a connecting plate 4, and a top 5 mounted on the upper ends of the end pieces and connecting plate. In the front of the reservoir the end pieces 2 and 3 are preferably provided with guiding members 6 extending the entire length of and overlapping the connecting plate 4 at its opposite sides, whereby a strip of material advertising the articles for sale by the machine may be conveniently inserted in front of the plate 4. At the rear, the plate 4 is provided with a pair of spaced supporting rods 7, also extending the entire length of said plate, and upon which is secured the rear inclosing plate 8. Said plate 8 is slotted vertically, as shown at 9, from the upper end nearly to the base of the plate, the base of the plate being provided with a horizontal flange 10 adapted to rest on the top of the lower casing 1. The plate 8 ends somewhat short of the top of the connecting plate 4 and in the present embodiment is spaced by the supporting rods 7 a sufficient distance apart from the rear face of the connecting plate to accommodate between them a single or any desired number of parallel sheets of stamps. To assist in inserting the stamps between the plates 4 and 8 when charging the machine, the upper end of the plate 8 is beveled outwardly from the rear face of the plate 4, as shown at 11. The articles contained in the reservoir, for convenience, will be hereinafter termed the sheet. The sheet is adapted to be fed downwardly in the reservoir by suitable pressure means, preferably, however, by a long thin weighted feeding member 12 which travels down in the space or chute between plates 4 and 8.

The feeding member 12 is illustrated in detail in Figs. 13 and 14 of the drawings. As shown therein, said feeding member embodies a substantially rectangular plate 13 to the front face of which is secured a spring plate 14, whereby the upper edge of the sheet may be inserted between and clamped by the spring plate 14 and the plate 13. If, as in the present instance, the articles to be sold are stamps, the upper unprinted edge or margin of the sheet of stamps will be inserted between the spring plate and the plate 13, or in case no margin is left on the sheet a small strip of paper may be laid on the sheet with the edge of the paper projecting from the upper edge of the sheet, so that the paper enters all the way into the space between the spring plate and the plate 13, whereas only the extreme edge of the sheet of stamps will lie between said plates. In the latter case, the paper and the extreme edge of the sheet clamped between the plates is sufficient to properly position the sheet relatively to the feeding member or holder, and at the same time no part of the printed surface of the stamps will be covered and the stamps will be brought into proper registry for severing and delivery, as will hereinafter appear. Movement of the sheet inwardly of the feeding member, when inserting and positioning the sheet therein is limited by a row of projections 15 formed in the spring plate 14, and extending inwardly into recesses 16 in the plate 13, as shown more particularly in Fig. 14. The lower edge of plate 13 adjacent the free end of the spring plate is beveled, as at 17 to more efficiently clamp the sheet against the plate 13. The spring plate 14 is somewhat less in length than the plate 13 so as to permit the ends of the latter to project beyond the ends of the spring plate, these projecting ends being beveled downwardly from the ends of said spring plate, as shown at 18, to permit easy insertion of the strip between said plates, which will be from the end of the feeding member, as will be readily understood. Secured to the rear face of the plate 13, is a projection, permitting the feeding member to be readily grasped by the hand, said projection preferably consisting of a substantially U-shaped member 19 with the upper and lower arms 20, 21, thereof, projecting outwardly from the rear face of the plate 13. Also secured to the rear face of plate 13 is a spring finger 22 which projects from the upper edge of said plate. The purpose of said spring finger 22 will hereinafter be explained.

At the exit or bottom of the reservoir, the sheet passes between clamping members, preferably composed of a fixed clamp 23, located between the end wall 24 and the intermediate wall 26 of the lower casing, and a movable clamp 27, the latter being pivotally mounted in the end walls 24 and 25 on pivots indicated at 28. To permit passage of the movable clamp, the intermediate wall 26 of the lower casing is slotted as shown at 29. Below the clamping members, the sheet passes between and is held against buckling by fixed guides 30 and fixed cutters 31, which are arranged vertically edgewise to the sheet, as shown more particularly in Fig. 6, the upper edges of said guides and cutters being rigidly connected with suitable cross pieces 32, 33, of the fixed frame, and the lower ends of said guides and cutters being adapted to travel in narrow grooves 34 formed in a rotary drum or periphery of a drum shaft 35. The forward cross piece 33 to which the fixed clamp 23 is secured and the upper edges of the fixed cutters 31 is supported by the end walls 24 and 25 of the lower casing; the rear cross piece 32 to which the upper edges of the fixed guides 30 are secured is supported by the side wall 24 and intermediate wall 26 of said casing. Conveniently, the shaft 35 may be provided with a series of collars 36 which form the periphery of the drum and are spaced apart a sufficient distance to form the grooves for the reception of the lower ends of the fixed guides and cutters, and each sleeve is provided with a more or less radial cutter adapted to coöperate with the fixed cutters for severing the articles from the lower edge of the sheet. These movable cutters preferably have a diagonally arranged end cutting edge 37 and a more or less tangentially arranged side cutting edge 38 formed as a part of cutting blades which are attached to the movable cutter bodies 39, the arrangement of each cutter being such as to sever the article by a diagonal shearing cut at the upper edge and by a straight radial cut at the side edge.

In the present machine, there are five cutters arranged in stepped order or spirally around the shaft or drum 35 and are adapted to move past the fixed guides and cutters in succession one at each operation of the shaft. Secured to each cutter body 39 in the rear of the cutter blade is a deflector plate 40 positioned so as to project rearwardly of the cutter body and beyond the adjacent end of the diagonal cutting edge 37 of an adjacent cutting blade. Thus a stamp is prevented from being arrested by the cutter body of an adjacent blade which has previously made a cutting operation and has been moved to a position approximately horizontal. This prevents any danger of the stamps sticking in the machine and insures their proper delivery under all circumstances.

The sheet being clamped immediately above the cutters by the clamping members 23 and 27, as hereinbefore described, removal of the full row of articles from the lower edge of the sheet is permitted and then the clamps must be released so that the sheet may feed downwardly to present another row of articles to be removed. This is accomplished by normally holding the pivoted clamping member 27 in position against the fixed clamping member 23 by a spring 41, Fig. 8, and immediately after the cutter for removing the last article from a row has passed its cutting position, the clamping member 27 is moved reversely or against the tension of the spring 41 by a clamp releasing projection 42 on the shaft 35, striking the lower end 43 of the clamp supporting arm, thus moving the clamp 27 away from the fixed clamp and permitting the sheet to feed downwardly to present a new row of articles for severing and subsequent delivery in succession. The projection 42 immediately moves out of engagement with the clamp and the latter is returned by the spring to the normal clamping position against the fixed clamp 23. When the stamps have been severed they are thrown forwardly by the movement of the cutters and drop down into a position where they may be conveniently removed by the person to whom they belong. As shown more particularly in Fig. 1, the stamps drop down into a receptacle 44 in the front of the apparatus, where they are in plain view and may be readily picked up. The operation of severing the stamps from the row may be watched through a transparent plate 45 secured to the front plate 46 of the lower casing.

At its right hand end, the shaft or drum 35 is provided with a ratchet wheel 47 having a number of teeth corresponding to the number of spirally arranged cutters on the drum and rotatably mounted on the shaft is an operating lever 48 having its end 49 encircling the shaft of a disk-like formation and its outer end 50 which projects through the slot 51 in the front plate 46 of the lower casing in the form of a finger piece which is adapted to be depressed at each operation of the machine. The disk-like end 49 of the operating lever carries a hook pawl 52 which is adapted to engage successively the teeth of the ratchet wheel 47 and a locking pawl 53 having at its forward end a counterweight 54 and its rear end provided with a locking hook or shoulder adapted to engage a locking projection 55 mounted on the intermediate plate 26 of the fixed frame. It will thus be seen that before the lever can be moved, so as to operate the machine, the rear end of the locking pawl 53 must be depressed in order to remove the hook from engagement with the locking projection 55. This result may be accomplished by a coin or token which is introduced through a coin slot 56 in the top plate of the lower casing and travels down the incline 57 onto a ledge 58 on the rear end of the locking pawl, the weight of a coin of the proper denomination deposited on said ledge 58 being sufficient to depress the rear end of the locking pawl 53 and disengage the hook from the locking projection 55. The forward end of the incline 57 is provided with a slot 59 of a size to permit all coins of a diameter smaller than the proper coins to fall through the slot to the bottom of the inner casing. To prevent release of the locking pawl 53 by the insertion of a sharp implement, such as a hat pin, for instance, the incline is provided with a slot 59ª through which a hat pin inserted in the machine will pass and be deflected from the path of the locking pawl. The present machine is designed to be operated by a nickel, and, hence, the slot 59 will be small enough to prevent a nickel from falling through but large enough to permit all coins smaller in diameter than a nickel to pass through. The entrance slot 56 may be made of such size that no coin of larger diameter than a nickel may be deposited in the machine.

Assuming that the locking lever or pawl 53 is released, the operating lever 48 may be depressed, and in its forward movement, said operating lever will operate the cutters said forward movement of the operating lever being effective to advance the drum or shaft one step, because of the engagement of the pawl 52 with a tooth of the ratchet wheel 47. During the forward movement of the operating lever, the pawl 52 is pressed into engagement with the tooth of said ratchet wheel, by means of a spring 60, and at the end of said forward movement the pawl 52 is adapted to be released from engagement with the tooth of said ratchet wheel by means of a cam or releasing bar 61 secured to the base of the lower casing and positioned to pass between the pawl 52 and the ratchet wheel 47 at the end of the forward movement of the lever 48. A spring detent member 62 is secured to a fixed portion of the frame such as the cross piece 33 and is positioned to engage the tooth of the ratchet wheel 47 at the end of the forward movement of the operating lever 48 and thereby hold the same against movement when the operating lever is released at the end of its forward movement. This provides a positive means for holding the shaft 35 against reverse movement. It will be noted that each tooth of the ratchet wheel is formed with substantially straight forward and rear edges, respectively, 63 and 64, but with the forward edge 63 higher than the rear edge 64, whereby the spring detent 62 may slip behind the forward edge of the tooth and hold the ratchet wheel against movement during the releasing movement of the operating lever, and, at the same time, the operating lever may move the ratchet wheel forwardly for the required distance without any interference from the spring detent 62.

In the manipulation of the machine, should the person operating the lever not depress it the full distance necessary for severing an article or the stamps and permit the lever to return under the influence of its return spring 65 to a position in advance of the normal position of said lever, there would be danger of the locking pawl 53 not engaging with its locking projection, so that another operating movement of the lever might be accomplished without the deposit of another coin. To overcome this difficulty there is fixed to the intermediate plate 26 of the fixed frame, a rack bar 66 having on one edge a series of downwardly projecting teeth 67 and on the opposite edge a series of upwardly projecting teeth 68. Pivotally mounted on the disk-like portion 49 of the operating lever 48 is a lever 69 having a stud 70 adapted to engage the teeth of the rack bar 66. The stud 70 is pressed into engagement with said teeth by means of a spring 71 bearing against the pivoted lever 69 and encircling the rack bar 66. With this construction, the stud 70 and lever 69 may move downwardly only on one side of the rack, and may only move upwardly on the other side of the rack, because of the opposite inclination of the teeth. During the forward movement of the operating lever, the stud 70 is in engagement with the downwardly projecting teeth 67 of the rack and during the releasing or reverse movement of the operating lever, said stud is in engagement with the upwardly projecting teeth of the rack. Hence, an incomplete forward as well as an incomplete releasing movement of the operating lever will through the engagement of the stud with the teeth of the rack 66 serve to lock the lever against movement in the opposite direction at the wrong time.

It is desirable that the coin slot 56 be closed against the deposit of a coin during the movement of the operating lever 48. For this purpose a slide 72 is provided having an opening 73 adapted to normally register with the opening 56, i. e. when the said operating lever is at rest, the slide being held in such position by the lever engaging the vertical cam edge 74 of the slide so as to push the opening 73 of the slide into registry with the slot 56. When, however, the operating lever 48 is moved forwardly in the manipulation of the machine to sever and discharge an article, a spring 75 attached to said slide 72 moves the latter so as to close the slot 56. Thus, whenever the lever 48 is moved away from its position of rest, the movement of the lever carries it away from engagement with the cam edge 74 of the slide, permitting the spring 75 to act and close the slot.

The invention provides a novel mechanism for closing the slot and also locking the lever 48 against operation when the supply of articles in the reservoir has been exhausted, and the machine will be incapable of operation until said supply has been replenished. This not only insures honest sales, but prevents idle manipulations of the machine and consequent unnecessary wear and tear on the parts. Pivoted at 76 to a fixed portion of the frame is a bell-crank lever having a horizontal arm 77$^a$ and a vertical arm 77$^b$, in engagement with a pin 77 journaled for rotary and sliding movement in the intermediate plate 26. The pin 77 is adapted to project outwardly through the end plate 25 of the lower casing, and a collar 78 fixed to said pin limits the inward movement thereof, which may be effected manually, as will hereinafter appear. Fixed to the pin 77 is a depending lever arm 79 having a projection 80 adapted to be engaged by a finger 81 on the drum or shaft 35, when said projection 80 is shifted so as to lie in the path of the finger 81, as will presently appear. Pivoted at 82 to a fixed portion of the frame is a gate 83 adapted when moved by the lever arm 79 to cover the slot 56. The gate is held in position wherein the slot 56 is normally open by a spring 84. Also formed on said lever arm 79 is a projection 85 which is adapted to engage and move a spring bell clapper 86, in the movement of the lever arm 79 to close the gate 83. The movement of said arm will be sufficient to place the spring of the bell clapper under tension, and then release the bell-clapper so as to cause the latter to ring the bell 87. Journaled for sliding movement in a vertical bearing 88 mounted on the top plate of the lower casing is a pin 89. This pin 89 is positioned to be engaged and depressed by the lower arm 21 of the U-shaped projection when the feeding member 12 has reached a sufficiently lowered position in the vertical reservoir, which will be when the last row of articles on the sheet secured to said feeding member is in position for severing and delivery by the cutters, in the manner hereinbefore set forth. The said pin 89 when depressed, engages the horizontal arm 77$^a$ of the bell crank lever so as to move the vertical arm 77$^b$ against the pin 77 and shift the latter against the tension of its spring 90, such movement of the pin 77 projecting the outer end of the pin through the end wall 25 of the lower casing and also shifting the lever arm 79 to position the projection 80 of the latter in the path of the finger 81 on the drum or shaft 35. The finger 81 is moved into engagement with said projection 80, during the operation of severing the last stamp or stamps from the bottom row, and the movement imparted to the lever arm 79 causes the latter to engage the gate 83, throwing said gate against the influence of its spring to a position in which the slot 56 is covered. Simultaneously with the above described movement of the lever arm the bell 87 will be rung, giving notification of the fact that the supply of articles in the machine is exhausted. The lever arm is held in its gate locking position by the finger 81 on the drum 35, and, inasmuch, as no coin can be deposited in the machine, further manipulation of the operating lever will be impossible because of the engagement of the locking pawl 53 with its locking projection 55.

The projection 80 may be shifted out of the path of the finger 81 to permit the spring 84 to open the gate, by pushing in on the pin 77, which has been projected out of the end wall of the casing. This however can only be effected when the feeding member 12 is removed from its lowermost position in the reservoir, for instance by replenishing the stock of articles or stamps. Positioned to be engaged by the spring finger 22 of said feeding member, when the latter reaches its lowermost position, is a locking recess 91. When the finger 22 enters said recess the feeding member is locked against lifting movement by the finger 22 in the recess 91, and, since the pin 89 is depressed by the feeding member and is holding the pin 77 outwardly, the latter can not be pushed inwardly to set the parts for operation, until said feeding member is elevated manually.

Incidental to the operating movement of the lever 48 a register 92 is actuated to count the articles as delivered. The register 92 is mounted on a fixed portion of the lower frame and may be viewed through a sight opening in the top of the lower casing. Said register may be of any preferred construction having a spring-returned operating arm 93. Mounted on the disk-like end of the operating lever 48 is an arm 94 adapted to engage the arm 93 during the forward movement of the operating lever, so as to move the arm 93 and effect the operation of the register. By an adjustment of the arm 94 the throw of operating arm 93 may be regulated and thus the register can be actuated to move several steps during a single operating cycle of the machine, so as to render a correct count when a plurality of stamps, for instance, is delivered at a single operation, or the register may be set to move only one step at a time to count the coins received.

The rear of the reservoir is preferably closed by a plate 95 having a lock 96, and the rear wall of the lower casing may be provided with a door 97 permitting access to the coin receptacle 98 in which the coins deposited in the machine are stored. If the machine is designed particularly for the vending of stamps, as in the present embodiment, the casing may be equipped with a suitable scale 98 for weighing the articles to be posted. As shown in Fig. 1, the scale may be conveniently mounted on the top of the reservoir.

What is claimed is:

1. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed and means for locking the machine against operation, said locking means being normally disconnected from the operating parts of the machine and adapted to remain inactive until the last article of the last row has been severed and positively operated connections for actuating said locking means.

2. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed, means for feeding another row into severing position when said clamping means is released, normally inoperatively positioned locking means adapted to be set by feeding the last row into severing position, and positively operated connections for actuating said locking means when the last article of the last row is severed.

3. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed, means for feeding another row into severing position when said clamping means is released, normally inoperatively positioned locking means adapted to be set by feeding the last row into severing position, an alarm, and positively operated connections for actuating said locking means and alarm when the last article of the last row is severed.

4. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed, a member for feeding another row of articles into severing position, locking mechanism adapted to be set by said member when the last row of articles is fed into severing position, and means for actuating said locking mechanism when the last article of the last row is severed.

5. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed, a member for feeding another row of articles into severing position, locking mechanism adapted to be set by said member when the last row of articles is fed into severing position, and means for establishing a connection by the movement of the shaft to sever the last article of the last row for actuating said locking mechanism.

6. The combination with a rotary drum, of a plurality of cutters mounted on said drum, in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating said drum and cutters step-by-step and for releasing the clamping means after the last article of a row has been severed, a weighted clamping member adapted to engage and hold the upper edge of the sheet of articles and feed the rows successively into severing position, locking mechanism adapted to be set by said member when the last row of articles is fed into severing position, and means for actuating said locking mechanism when the last article of the last row is severed.

7. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating said drum and cutters step-by-step and for releasing the clamping means after the last article of a row has been severed, a member for feeding the rows by gravity successively into severing position, locking mechanism adapted to be set by said member when the last row of articles is fed into severing position, means for actuating said locking mechanism when the last article of the last row is severed, and means for locking said feeding member in such setting position.

8. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating said drum and cuters step-by-step and for releasing the clamping means after the last article of a row has been severed, a member for feeding the rows by gravity successively into severing position, locking mechanism adapted to be set by said member when the last row of articles is fed into severing position, means for actuating said locking mechanism when the last article of the last row is severed, means for locking said feeding member in such setting position, and means for manually releasing said first named locking mechanism when said feeding member is moved out of its setting position.

9. The combination with means for holding a series of articles in a connected sheet in position to have the articles severed and delivered individually, and fixed cutters and guides in line with the divisions between the articles to support the same in delivering position, of cutters movable between the guides and cutters for severing and delivering the articles, and side deflecting plates mounted on the respective movable cutters for insuring the delivery of the articles.

10. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last articles of a row has been severed, normally, inoperatively positioned locking means for locking the machine against operation when the last article of the last row has been severed, and means for setting the locking means when the last row of articles is fed into severing position.

11. The combination with a rotary drum, of a plurality of cutters mounted on said drum in stepped relation to each other, a broad, thin reservoir for holding a sheet of connected articles and having a broad exit parallel with the axis of the drum through which a row of articles may be projected into the path of the cutters, means for clamping the sheet with the lower row of articles in severing position, means for rotating the drum and cutters step-by-step and for releasing the clamping means after the last article of a row has been severed, and a plurality of means for permanently locking the machine against operation when the last article of the last row has been severed.

WILLIAM G. TEMPLETON.